UNITED STATES PATENT OFFICE.

WILLIAM A. HALL, OF NEW YORK, N. Y.

PROCESS OF MAKING GAS FROM OIL.

1,105,772.  Specification of Letters Patent.  Patented Aug. 4, 1914.

No Drawing.  Application filed June 25, 1913. Serial No. 775,741.

*To all whom it may concern:*

Be it known that I, WILLIAM A. HALL, citizen of the United States, residing at New York, in the county of New York and State of New York, have invented or discovered certain new and useful Improvements in Processes of Making Gas from Oil, of which the following is a specification.

This invention relates to the production of combustible gases from oil by a method which is much more simple, and which requires very much less complicated apparatus than the processes previously used.

It has been proposed by many inventors, to produce gas suitable for burning, by cracking heavy oils, such as petroleum oil in its crude condition, or "still bottoms" of petroleum oil, or "stripped oil," by passing these through a heated checker-work maintained at a temperature approaching a white heat, but owing to the fact that the high temperature is essential and owing to mechanical difficulties, these processes have not, so far as I am aware, come into general use.

In my improved process I do away with the necessity of the use of a checker-work maintained at a white heat and to the great mechanical disadvantages due thereto, and produce the gas from the oil in a single operation.

In carrying out my process I preferably proceed in the following manner: A mixture of oil and water, which may be in substantially equal proportions, is passed through a heated receptacle containing metallic nickel, which may be in the form of shot, or small irregularly shaped pieces, and which is maintained at a temperature high enough so that the nickel will cause the dissociation of water into its elements, which temperature is also high enough so that nickel oxid cannot exist in the presence of the reducing agents present, such a temperature being for example, about 650 to 750° C. Under these conditions the hydrocarbons of the oil are first cracked into hydrocarbons having a smaller number of carbon atoms, and a part of the water present is converted into hydrogen and oxygen, which hydrogen attaches itself to some of the unsaturated hydrocarbon bodies present, and the oxygen attaches itself to carbon atoms, forming principally CO, although there may be some $CO_2$ also produced, since it is practically impossible to maintain the temperature exactly at the point at which CO will be formed exclusively instead of some $CO_2$. In carrying out this process crude petroleum oil may be employed, although for economical reasons, I prefer to use "still bottoms" or "stripped oil," or oil from which at least the gasolene and kerosene fractions have been distilled. Should the oil employed contain material quantities of sulfur, such as Beaumont oil, Lima oil, or certain of the Canadian oils, which are high in sulfur, this sulfur would not materially injure the nickel, since the temperature is above that at which the catalytic properties of nickel are destroyed by union with sulfur, but on the contrary this sulfur would be converted principally into the form of hydrogen sulfid, although small amounts of carbon disulfid might me formed. These sulfur compounds can be removed from the gas by any of the usual or approved methods, if their presence in the gas would be objectionable in the particular process in which the gas is to be employed. In place of pure nickel, I can use nickel containing small quantities of other metals, such as cobalt or copper which is commonly associated with nickel, and nickel containing small quantities of cobalt appears to facilitate this reaction, even better than pure nickel.

As stated above, I may use a mixture of oil and water in substantially equal proportions, although this is by no means essential. The proportion of water used will ordinarily depend upon the consistency of the oil, and enough water is preferably used to produce a liquid which can very readily be caused to travel through the pipes into the decomposing chamber, but in nearly all cases I use very much more water than will be actually decomposed. In using equal parts of oil and water, only a small part say up to about 50% of the water used will be decomposed, the remainder being volatilized and passing on with the gas, and is removed as a condensate upon cooling the gas. Owing to the fact that heating the mixture of oil and water to the temperature stated gives some pressure, it is necessary to use a force pump or its equivalent in forcing the oil and water into the decomposing vessel. At this pressure and high temperature, there is quite a tendency for the oil in cracking, to form a crust or scale on the walls of the decomposing vessel, and on the nickel, but the excess of water always present overcomes this to a large degree. This is one of the reasons why it is necessary to use a considerable excess of water.

In operating my process upon a particular sample of "stripped oil," which contained substantially no sulfur, I produce gases having the following composition (by volume):—

| | |
|---|---|
| Methane | 48.60% |
| Ethylene | 40.52 |
| Free hydrogen | 6.41 |
| Free nitrogen | 1.79 |
| Free oxygen | 1.06 |
| CO and $CO_2$ | 1.60 |
| $H_2S$ and $CS_2$ | None |
| | 99.98% |

It will be thus seen that by my process I can produce a gas mixture which contains approximately equal proportions of methane, and ethylene, together with small quantities of free hydrogen, and traces only of other gases. This gas has great advantages over coal gas, for the reason that it is easily prepared, and by the combustion of this gas large amount of heat are produced (1500 B. T. U.), and since it contains substantially no diluents, the flames of this gas can be very accurately regulated, to produce the exact conditions needed for any particular process in which it is to be employed.

What I claim is:—

1. A process of making a combustible gas, which comprises bringing a mixture containing substantially equal parts of water and oil into contact with a metal having the property of causing the dissociation of water into its elements, at a temperature of about 650 to 750° C.

2. A process of making a combustible gas, which comprises bringing a mixture containing water and oil into contact with metallic nickel, at a temperature at which nickel cannot remain combined with the oxygen of said water.

3. A process of making a combustible gas, which comprises bringing a mixture containing water and oil into contact with a metallic nickel containing small amounts of cobalt, at a temperature at which said metals cannot remain combined with the oxygen of said water.

4. A process of making a combustible gas which comprises subjecting a mixture of a mineral oil and water, to the action of metallic nickel at a temperature of about 650 to 750° C.

5. A process of making a combustible gas, which comprises cracking a mineral oil, and simultaneously decomposing water into its elements, and causing the hydrogen from the decomposed water to react with the products of said oil cracking step to produce methane and ethylene, and causing the oxygen from said decomposed water to react with carbon to produce oxids of carbon, said operation being carried out in the presence of a catalytic metal.

6. A fuel gas consisting principally of methane and ethylene, in substantially equal parts, together with small quantities of hydrogen, carbon monoxid and carbon dioxid, said gas producing approximately 1500 B. T. U. upon combustion.

In testimony whereof I have affixed my signature, in presence of two witnesses.

WILLIAM A. HALL.

Witnesses:
A. B. FOSTER,
A. M. PERKINS.